Patented Oct. 6, 1936

2,056,822

UNITED STATES PATENT OFFICE 2,056,822

PREPARATION OF PHENYL-MAGNESIUM CHLORIDE

Edgar C. Britton and Harold R. Slagh, Midland, Mich., assignors to The Dow Chemical Company, Midland, Mich., a corporation of Michigan No Drawing. Application January 11, 1935, Serial No. 1,361

5 Claims. (Cl. 260—160)

The present invention concerns an improved method of synthesizing certain benzene derivatives, particularly phenyl-magnesium chloride and phenyl ethyl alcohol, from chlorobenzene compounds by the "Grignard" type of reactions. By a "chlorobenzene compound" we refer to a compound selected from the class consisting of chlorobenzene and substituted chlorobenzenes, which compound contains no group or radical other than chlorine that is as reactive with magnesium as is a chlorine substituent in said compound. This application is a continuation-in-part of our copending application, Serial No. 597,629, filed March 8, 1932, and issued April 9, 1935 as United States Patent No. 1,996,746.

In said copending application, we have disclosed that an aryl magnesium chloride may be prepared by mixing metallic magnesium with preferably its molecular equivalent or more of a chlorobenzene compound and heating the mixture in a closed reactor to a reaction temperature between 150° and 210° C.

When the aforesaid method is carried out on a commercial scale in relatively large batches, however, certain difficulties are encountered. The materials react rapidly with evolution of considerable heat, forming a thick doughy mass which is hard to stir, and thereby making it difficult to secure a proper control of temperature in the mass. When overheating occurs the reaction materials may be largely converted to undesirable by-products, and the yield of the desired phenyl-magnesium chloride is lowered in proportion to the amount of such by-products formed. It is desirable to provide means for securing at all times a positive control of temperature of the reaction mass, so as to prevent overheating and losses resulting therefrom.

We have now found that such overheating and resultant by-product formation can largely be avoided by first heating the magnesium with only a portion of the chlorobenzene compound required to react therewith until the reaction is started and thereafter feeding the remainder of said chlorobenzene compound to the reaction gradually at a rate which does not cause a sudden or excessive temperature rise. As regards the production of phenyl-magnesium chloride by reacting magnesium with chlorobenzene, we have also found that although the reaction may be carried out at any temperature between 130° and 210° C., the reaction proceeds most smoothly to produce phenyl-magnesium chloride in maximum yield when carried out at a temperature between 150° and 170° C. We have still further found that following such reaction for the production of an aryl magnesium chloride, the crude reacted mixture may be thinned with or dissolved in a non-reactive solvent and be employed directly as a reactant in the synthesis of other organic products by the well-known Grignard reactions, without separating the phenyl-magnesium chloride therefrom. The invention, accordingly, consists in the method hereinafter fully described and particularly pointed out in the claims.

In making phenyl-magnesium chloride by our method, comminuted magnesium, e. g. magnesium powder or turnings, is heated in a closed reactor, with stirring, to a reaction temperature between 150° and 210° C., preferably between 150° and 170° C., in the presence of a relatively small proportion, e. g. less than 0.2 its molecular equivalent, of dry chlorobenzene. If desired, a catalyst, such as iodine, an alkyl bromide, an alkyl magnesium halide, copper, a copper compound, ferric chloride, etc., which is known to facilitate the formation of a Grignard reagent by usual procedure, may be added to promote the reaction, but the reaction can be started and carried out smoothly in the absence of such catalyst.

After the reaction is started, additional chlorobenzene is fed into the reactor, either intermittently or continuously, at a rate such that the reaction runs smoothly at the desired temperature, with no sudden or excessive rise in temperature. The introduction of chlorobenzene is preferably continued until an excess thereof over the amount theoretically required in the reaction has been added, although a smaller proportion of chlorobenzene may be used, if desired. After all of the chlorobenzene has been added, the mixture is preferably maintained at the reaction temperature, with continued stirring for 0.5 hour or longer in order to assure complete reaction. The reactor is then cooled and opened.

The phenyl-magnesium chloride product is only sparingly soluble in chlorobenzene and may, if desired, be extracted with hot chlorobenzene to remove traces of diphenyl and other organic by-products therefrom, after which it may be dissolved in a solvent such as ethyl ether, amyl ether, an ether-benzene solution, or other inert solvent, and then employed as a reagent for the production of other organic products by the usual Grignard reactions. During such extraction, however, a portion of the phenyl-magnesium chloride becomes dissolved in the chlorobenzene and is lost to the successive reactions.

As above stated, we have found that the diphenyl and other by-products, which are usually formed in small amount along with the phenyl-magnesium chloride, do not interfere with the use of the latter in the subsequent Grignard reactions. Accordingly, after reacting magnesium with chlorobenzene to produce phenyl-magnesium chloride, instead of separating the latter as described above, the crude reaction mixture may be treated directly with additional chlorobenzene, or other solvent, e. g. an ether-benzene solution, which is incapable of reacting to destroy the phenyl-magnesium chloride product, in amount sufficient to dissolve an appreciable portion of said product. The resultant solution or mixture may be employed as an agent in the well-known Grignard reactions. For instance, phenyl ethyl alcohol may be produced by passing ethylene oxide into such solution or mixture, while stirring and maintaining the latter at a temperature between 20° and 80° C., and hydrolyzing the resultant mixture with water. The phenyl ethyl alcohol, so formed, may be steam distilled from the mixture, and purified by redistillation.

Although the above description has, for sake of clarity, been restricted to the production of phenyl-magnesium chloride and phenyl ethyl alcohol by our method, the invention is not limited thereto. By similar procedure monochloro-toluene, monochloro-xylene, 2-chloro-ethyl-benzene, ortho-dichloro-benzene, monochloro-phenetole, monochloro-anisol, etc., may each be reacted with magnesium to form corresponding aryl magnesium chlorides, although in the case of ortho-dichloro-benzene, only one of the chlorine substituents appears to be reactive with magnesium.

In synthesizing organic compounds according to the present method, the reaction between magnesium and a chlorobenzene compound may, if desired, be carried out in the presence of ether, an ether-benzene mixture, or other inert solvent and the reacted mixture may thereafter be employed directly in subsequent Grignard reactions without the addition of more solvent. However, the reaction between magnesium and a chlorobenzene compound proceeds smoothly in the absence of a solvent under the conditions hereinbefore described and the use of a solvent in carrying out such reaction is somewhat disadvantageous in that it requires the employment of apparatus capable of withstanding high pressure. When no solvent is used, the pressure generated by the reaction mixture seldom exceeds 200 pounds per square inch, since only a small proportion of the chlorobenzene compound is present at any given time and said chlorobenzene compound is rapidly converted into a non-volatile aryl magnesium chloride by reaction with the magnesium.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method which comprises heating magnesium with a relatively small amount of a chlorobenzene compound in a closed reactor to a reaction temperature between about 150° and about 210° C., and, after the reaction is started, introducing more of the chlorobenzene compound, at a rate which will not cause the reaction temperature to rise above 210° C., the mixture being stirred during substantially the entire reaction period.

2. The method which comprises heating magnesium with less than 0.2 molecular equivalent of a chlorobenzene compound in a closed reactor to a reaction temperature between 150° and 210° C., and, after the reaction is started, introducing more of the chlorobenzene compound, at a rate sufficient to maintain the reacting mixture at a temperature between 150° and 210° C., the mixture being stirred during substantially the entire reaction period.

3. The method which comprises heating magnesium with less than 0.2 molecular equivalent of chlorobenzene in a closed reactor to a reaction temperature between 150° and 210° C., and, after the reaction is started, introducing more chlorobenzene at a rate which will not cause the reacting mixture to become heated to a temperature above 210° C., the mixture being stirred during substantially the entire reaction period.

4. The method which comprises stirring and heating magnesium with less than 0.2 molecular equivalent of chlorobenzene, in a closed reactor at a reaction temperature between about 150° and about 170° C., and, after the reaction is started, introducing more chlorobenzene at a rate which will not cause the reacting mixture to become heated to a temperature above about 170° C., stirring being continued during substantially the entire reaction period.

5. The method which comprises heating magnesium with a relatively small amount of chlorobenzene in a closed reactor to a reaction temperature between about 150° and about 170° C., and, after the reaction is started, introducing more chlorobenzene at a rate which will not cause the reaction temperature to rise above about 170° C., the mixture being stirred during substantially the entire reaction period.

EDGAR C. BRITTON.
HAROLD R. SLAGH.